April 21, 1970    J. M. GRENIER    3,507,947

MELT EXTRUSION PROCCESS AND SPINNERETTES

Filed Nov. 6, 1967

JOSEPH MEDERIC GRENIER
INVENTOR

United States Patent Office 3,507,947
Patented Apr. 21, 1970

3,507,947
MELT EXTRUSION PROCESS AND SPINNERETTES
Joseph Mederic Grenier, Drummondville, Quebec, Canada, assignor to Chemcell Limited, Montreal, Quebec, Canada
Filed Nov. 6, 1967, Ser. No. 680,688
Int. Cl. B28b *3/20*
U.S. Cl. 264—176                7 Claims

ABSTRACT OF THE DISCLOSURE

A spinnerette for enhancing the stability of melt extrusion processes, particularly for the extrusion of cellulose triacetate continuous filaments, which includes a plurality of inlet canals converging into a single outlet canal leading to the spinning orifice, the apertures of said inlet canals each being smaller than the aperture of the common outlet canal, and the process of extruding therethrough.

---

This invention relates to an improved melt extrusion spinneret for highly heat degradable polymers and more particularly, arrangements to produce at spinneret orifices a better uniform flow of the extrudated polymers.

Though widely used for extrusion of filamentary plastic materials, the conventional spinnerets are not suitable for melt spinning unplasticized cellulose triacetate since said polymer degrades and discolours when subjected, for longer than one minute, to temperatures higher than its melting point. To obviate these difficulties, Canadian Patent 647,851 dated Sept. 4, 1962 by Killoran and Larue, discloses a special spinneret particularly adapted for the melt spinning of highly degradable polymers adapted for attachment to the end of an extrusion tube which comprises an electrical resistance plate having a central symmetrical protruding portion merging at its base into an integral annular orificed circular portion and extending onwards and upwards from said circular portion in an integral symmetrical skirt portion, and extending outwards from said skirt portion in an integral annular collar portion adapted to abut the end of an extrusion tube, the spinneret thus being adapted to form an enclosure across the mouth of an extrusion tube having a material-contacting surface area greater than that of a flat plate.

One disadvantage of the Killoran et al. teaching is the great difficulty of obtaining the continuous formation of a filamentary product. Another disadvantage is the difficulty of obtaining a uniform cross section area of the fibre. Yet another disadvantage is the plugging action in the delivery conduit generated from deposits, e.g. impurities, the size of the pigments extruded with the highly heat degradable polymers. Still another disadvantage is the non-uniformity of the end product and of the physical properties of such products. For example, the extrusion of non-uniform filament produces a yarn of irregular shade and tensile strength when it is commercially advantageous to obtain extruded fibres of reasonable regular cross section area.

Numerous attempts have failed to remedy the situation like the addition of a screen electrically heated or melting grid prior to the capillaries of the spinneret.

Having regard to the foregoing, the present invention provides an improvement as to the production of cellulose triacetate fibres. According to the present invention, the powder to be extruded is fed in a melt extruded apparatus possessing an improved die or spinning plate which stabilizes the flow of the melted cellulose triacetate at the spinning opening. It has now been discovered that the extrusion has been greatly improved by the use of one die, spinning plate or spinneret for melt extrusion which comprises for each delivery conduit at least two inlet canals concomitantly directed or converging to one single outlet canal directed outward to the spinning orifice, the apertures of said inlets each being smaller than the aperture of their common outlet. Surprisingly, it has been found that disruption in the continuous flow of the extruded material due to impurities and/or unmelted material which does block one single inlet per single spinning outlet will seldom block two inlets per single spinning outlet providing said inlets apertures are each independently smaller than the outlet aperture.

One advantage of the invention is the reduction of the filament breakages at the extrusion orifices. A second advantage is the production of a fibre having a more uniform cross section area. Another advantage is the production of a continuous extrusion process to obtain a more uniform product having uniform physical properties. Still another advantage is the discovery of a new melt spinning plate or die having a longer lifetime. By lifetime of a spinneret or spinning plate whenever referred to in this specification, we mean the time during which a spinning plate may reasonably operate without having to be pulled apart for cleaning. Other advantages and objects of this invention will appear from the following detailed description.

Constructional examples of the subject matter of the present invention are illustrated on the accompanying drawings, in which: except as otherwise stated in FIGURES 1 to 6, the construction of the spinning plate is similar to that described in Canadian Patent 647,851 cited above.

In the drawings which illustrate the embodiments of the invention:

Figure 1:
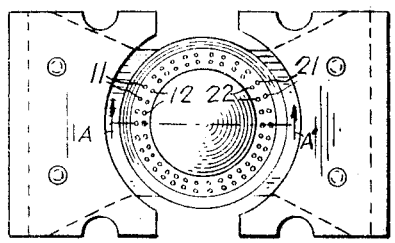
FIGURE 1 is a top plan view of a spinning plate.

In one preferred embodiment, the spinning plate is made up of pairs of inlets 11, 12; 21, 22 and the like concomitantly directed to a common outlet 13, 23 and the like. In FIGURE 1 the row of double inlets are shown equidistant from other sets and symmetrically distributed on an integral concentric band.

In a preferred embodiment, the inlet and outlet canals are cylindrical voids. The two inlets 11 and 12 meet at 14 to form a single ending or outlet at the spinning orifice. The angles 15 and 16 formed respectively by the slope of the inlets 11 and 12 with an artificial plane B, B' down perpendicular to the positive pressure exerted by the fed material on the jet is selected so as to be large enough to eliminate the turbulence produced by the material fed arriving from the inlets 11 and 12 on the outlet 13 and small enough to leave enough resistance to the material between the two inlets on the top of the spinneret to prevent collapse. The values of 15 and 16 though usually equal need not be so. For practical purposes, the outlet 13 is usually parallel with the gravitational force and perpendicular to the face of the spinning plate.

Figure 2:
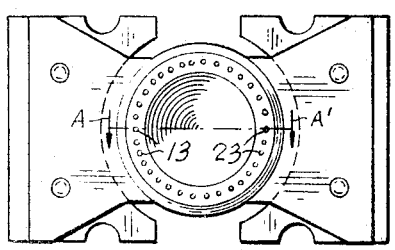
FIGURE 2 is a bottom plan view of the spinning plate shown in FIGURE 1.
Figure 4:
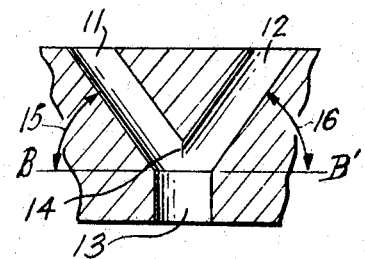
FIGURE 4 is a magnified front elevation view in cross section of a delivery conduit.

FIGURE 2 shows the single outlets 13, 23 and the like in a concentric row and at a distance equal from each other. In a particular embodiment of the invention a spinning jet may comprise at least 30 delivery conduits, a preferred spinning jet contains 33 conduits.

Figure 3:
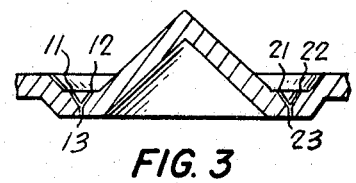
FIGURE 3 is an elevational view partly in cross section taken from A, A'.

FIGURE 3 is an elevational view partly in cross section of the spinneret taken from the line A, A' showing the relative arrangement of two sets of inlets 11, 12 and 21, 22 being each concomitantly directed to a single outlet or single opening 13 and 23 respectively.

Figure 5:
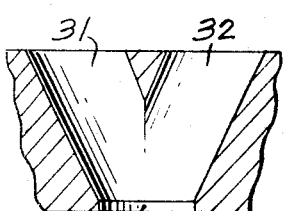
FIGURE 5 is another example of a delivery conduit in cross section.
Figure 8:
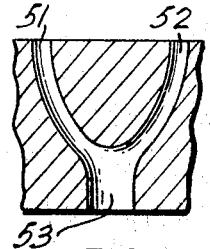
FIGURES 7 and 8 are other examples in cross section of outlets.
Figure 7:
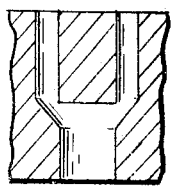
Figure 6:
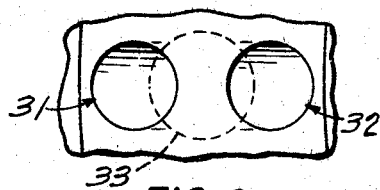
FIGURE 6 is a view of the delivery conduit shown in FIGURE 5 wherein the outlet, shown by dotted lines, is projected over the inlets.

In another embodiment, the outlet 33 is preferably very short as is seen in FIGURES 5 and 6 which show other examples of inlets 31 and 32 and outlet 33, said inlets and outlets being a cylindrical void. Of course the delivery tubes need not be of Y shape as seen in Diagrams 7 and 8 wherein 41, 42 and 51, 52 represents the respective inlets of two other embodiments of said invention and 43, 53 their respective outlets, although less preferred.

The preferred delivery conduits in accordance with the invention are generally capillaries of the order of a hundredth of an inch more preferably .010" to .060".

In the case of two inlets, the apertures of each of said inlets need to be smaller than the aperture of the outlet. The apertures of the delivery conduit may have any shape one may desire to have, but preferably right circular cylindrical voids.

It will be appreciated that there has been herewith disclosed a significantly improved melt spinning plate or die having a highly beneficial action considering the simplicity of the apparatus which makes possible new economies in fabrication and which are capable of obtaining a higher degree of quality in the end product.

It will be obvious that numerous modifications and variations of the present invention are possible without departing from the spirit of the above teachings. For instance, instead of having two inlets for each outlet, one may create a number $n$ of inlets for each single outlet, providing that each individual inlet has an aperture smaller than the common outlet aperture. Also, although in one embodiment of this invention the two inlets are in a same vetrical plane, the two inlets need not necessarily be in a same vertical plane.

It is obvious that the substance of the new spinneret used for melt spinning may also be adapted for other types of extrusion such as dry spinning or solvent spinning, though said invention is generally more beneficial when used in melt spinning. It is therefore to be understood that the present invention may be practiced otherwise than as specifically described herein, and it is not to be otherwise limited but by the full and fair scope of the appended claims when construed in the light of the accompanying disclosure by one skilled in the art.

In a preferred embodiment of the invention, cellulose triacetate is used as ground flakes such that not more than 5% of these flakes is retained on a screen of at least 60-mesh and the said powder is felt to a melt extruder. In one ambit of the invention the process can be carried for other polymeric substances, and mixtures thereof and with or without additives such as pigments as is well known in the art.

Pigments and other infusible compounds such as resin degradation products generally form deposits which gradually accumulate along the walls of spinneret orifices during the extrusion of fibres. This accumulation of deposits results into deformed filament cross-sections. It also lowers the throughput of the orifice, thus increasing the number of filament breaks. The continuous period of time during which a spinneret can perform its functions in a satisfactory manner is often referred to as the life of the spinneret. At the end of such a period, it is cleaned by specific technique and put back in service.

Experimental results have shown that by the use of the above melt spinning plate or die the lifetime of the dies is 20% longer.

In order to illustrate the invention, the following examples are given, although they are not intended to be limitative.

EXAMPLE I

Cellulose triacetate powder was ground to such a particle size that 5% would be retained on a 60-mesh screen and the remaining portion would pass the same mesh size. The powder was then dried to obtain a moisture level below 0.03% by weight. Mercadium Red pigment from Imperial Paper Company was then added to the powder at a concentration of 0.6% based on the weight of the powder, about an hour before the end of the drying cycle and tumbled with the powder for the remaining period of the cycle.

The pigmented acetate powder was then transferred to the hopper of an extrusion machine of the type described in Canadian Patent 647,851 dated Sept. 4, 1962 by Killoran and Larue and extruded into 15 denier per filament fibres at a jet temperature of 350° C. and a debit of 12.0 grams per minute.

The extrusion jet was of the straight orifice type described by Killoran and Larue. Extrusion stability as measured by the number of filaments breaking below the orificate outlet per pound of extruded yarn was found to be 0.10 break per pound.

EXAMPLE II

Another experiment was run using the same conditions as described in Example I except that the straight orifice extrusion jet was replaced by a converging orifice type as shown in FIGURES 1 to 4. In this experiment, an extrusion stability of 0.03 break per pound of yarn was measured thus the prior type of jet resulted in more than 3 times the number of filament breaks per pound. This represents therefore a threefold improvement.

EXAMPLE III

Another experiment was made in view of comparing the life of straight and of converging orifice types of spinneret. Conditions were the same as described in Example I except that the Mercadium Red pigment was replaced by the Chromophtal Yellow A2R from Ciba. The latter forms deposits in the orifices at a faster rate than the Mercadium Red. Under the conditions of the experiment, the spinneret with converging orifices had a useful life of 160 hours as compared to 120 hours for the one with straight orifices.

What is claimed is.

1. A process for stabilizing the melt extrusion of cellulose triacetate continuous filaments formed from a single melt fiber-formable composition of cellulose triacetate, which process comprises feeding said melt composition in the form of a plurality of continuous streams into a common stream of greater cross-sectional area than any one of said plurality of continuous streams and extruding said common stream.

2. The process of claim 1 wherein said common stream is extruded through an orifice having a greater cross-sectional area than any one of said continuous streams.

3. The process of claim 2 wherein two continuous streams are fed into said common stream.

4. An apparatus for melt extrusion of continuous filaments comprising a spinning plate and feed means for conveying a single melt material to be extruded communicating with said spinning plate, said spinning plate comprising at least one delivery conduit consisting of at least two inlet canals in communication with said feed means and concomitantly directly to one common single outlet canal directed outward of the spinning orifice, said inlet canals being each of independently smaller aperture than that of the common single outlet canal.

5. The spinning plate according to claim 4 wherein the inlet canals converge into said outlet canal.

6. The apparatus according to claim 2 wherein the delivery conduit has a Y shape.

7. The apparatus according to claim 2, wherein the outlet canal is substantially parallel to the gravitational force and perpendicular to the face of the plate.

References Cited

UNITED STATES PATENTS

| | | | |
|---|---|---|---|
| 1,956,564 | 5/1934 | Crane et al. | 264—177 X |
| 1,964,659 | 6/1934 | Brumberger | 18—855 |
| 1,978,163 | 10/1934 | McGow | 264—177 X |
| 2,900,708 | 8/1959 | Pond | 29—194 |
| 2,935,550 | 5/1960 | Reding | 18—855 |
| 3,075,241 | 1/1963 | Dietzsch et al. | |
| 3,176,342 | 4/1965 | Davis. | |
| 3,197,812 | 8/1965 | Dietzsch et al. | |
| 3,351,695 | 11/1967 | Hollingsworth | 264—177 X |
| 3,209,402 | 10/1965 | Riley et al. | |
| 3,399,259 | 8/1968 | Bragford et al. | |
| 3,408,277 | 10/1968 | Martin et al. | |

FOREIGN PATENTS 624,280  4/1963  Belgium.

JULIUS FROME, Primary Examiner

J. H. WOO, Assistant Examiner

U.S. Cl. X.R.

18—8

PO-1050
(5/69)

UNITED STATES PATENT OFFICE
CERTIFICATE OF CORRECTION

Patent No. 3,507,947      Dated April 21, 1970

Inventor(s) Joseph Mederic Grenier

It is certified that error appears in the above-identified patent and that said Letters Patent are hereby corrected as shown below:

Column 3, line 41, "vetrical" should be ---vertical---

Column 3, line 55, "felt" should be ---fed---,

Claim 5, line 1, "spinning plate" should be ---apparatus---,

Claim 6, line 1, "2" should be ---4---,

Claim 7, line 1, "2" should be ---4---.

SIGNED AND
SEALED
AUG 25 1970

(SEAL)
Attest:

Edward M. Fletcher, Jr.
Attesting Officer

WILLIAM E. SCHUYLER, JR.
Commissioner of Patents